United States Patent [19]

Meyers, deceased et al.

[11] Patent Number: 5,239,310

[45] Date of Patent: Aug. 24, 1993

[54] PASSIVE SELF-DETERMINED POSITION FIXING SYSTEM

[76] Inventors: William G. Meyers, deceased, late of El Toro; Roselee Meyers, executor, 26572 Heather Brook, El Toro, both of Calif. 92630

[21] Appl. No.: 916,347

[22] Filed: Jul. 17, 1992

[51] Int. Cl.⁵ .......................... G01S 3/02; G01S 13/00
[52] U.S. Cl. ...................................... 342/453; 342/55; 342/458
[58] Field of Search ............... 342/457, 453, 450, 464, 342/55, 58, 32, 455, 47, 46, 458

[56] References Cited

U.S. PATENT DOCUMENTS 3,836,961  9/1974  Ennis ....................................... 342/55

FOREIGN PATENT DOCUMENTS 618873  3/1949  United Kingdom ................... 342/55
1024982  4/1966  United Kingdom ................... 342/55

*Primary Examiner*—Gregory C. Issing
*Attorney, Agent, or Firm*—Roy A. Ekstrand

[57] ABSTRACT

A passive self-determined position fixing system for use by aircraft and other users such as sea-going vessels utilizes a directional radar in combination with an omnidirectional radar facility to produce a directional radar beam and simultaneous omnidirectional radar transmission. A television type broadcast facility provides a broadcast of the PPI display of the directional radar system. The directional radar pulse signals together with the omnidirectionally retransmitted radar pulse signals are processed by the position fixing system aboard the host aircraft or the like to determine range information. A display system such as a conventional television receiver responds to the broadcast PPI display to produce a similar display within the host aircraft. The position fixing system combines the PPI type display together with the information with the directional and omnidirectional radar transmissions to identify the user or host aircraft or vessel upon the PPI type display.

11 Claims, 2 Drawing Sheets

PASSIVE SELF-DETERMINED POSITION FIXING SYSTEM

FIELD OF THE INVENTION

This invention relates generally to position fixing systems and particularly to those used for navigation of aircraft and vessels at sea.

BACKGROUND OF THE INVENTION

Several systems have been provided for use by aircraft or sea-going vessels or the like in determining position with respect to a stationary object or reference point. In most systems, the user desiring to fix position with respect to one or more reference points radiates an electromagnetic signal and calculate range or bearing measurements with two different reference points and thereafter compute the user's position by triangulation or similar mathematical techniques. While such triangulation methods are technically sound, they are time consuming and may detract the user's attention from other required activities such as piloting the aircraft, etc. In addition, techniques which require that the user radiate an electromagnetic signal are costly and often complex. In addition, such systems are unsuitable for use in military environments in which the user desires to remain undetected.

A variety of imaging systems are available which utilize a cathode ray tube display often having overlays of maps, etc. in combination with a radar system. While the systems are in some respects effective, they often fail to provide the user with knowledge of the user's position within the cathode ray tube image.

The need for accurate systems for position fixing by aircraft and sea-going vessels has prompted practitioners in the art to develop a variety of systems. For example, U.S. Pat. No. 3,742,504 issued to Shores sets forth an AIRCRAFT COLLISION AVOIDANCE SYSTEM BY PASSING MEANS in which a passive collision avoidance system applicable to aircraft collision avoidance includes two receivers operating in combination with antenna having differing sensitivity to the polarization of the incoming signals from a ground broadcast facility. The differing sensitivity ensures that the direct end reflected signals will predominate in different receivers and therefore, when the outputs of the receivers are combined, the resultant fade rate will give an indication of movement of the intruding aircraft with respect to the equipped aircraft.

U.S. Pat. No. 4,293,857 issued to Baldwin sets forth a COLLISION AVOIDANCE WARNING SYSTEM utilizing a known location navigational ground station to enable a primary aircraft to determine its own position and employing a known location air surveillance radar including an interrogator to determine the location, velocity, course and altitude of a potentially conflicting other aircraft. The technique uses the time between the inception of an interrogating pulse and the reception of a transponder response from the target aircraft to compute the position and altitude of the aircraft.

U.S. Pat. No. Re. 32,368 reissued to Funatsu, et al. sets forth a COLLISION AVOIDANCE SYSTEM FOR AIRCRAFT in which one aircraft is equipped with an interrogation station having a secondary surveillance radar. A distance measurement is effected either by passive or active distance measurements or by both. If the distance falls within a certain limit, the output power and/or period of the interrogation signal of the secondary surveillance radar of the subject aircraft is altered.

U.S. Pat. No. 4,782,450 issued to Flax sets forth a METHOD AND APPARATUS FOR PASSIVE AIRBORNE COLLISION AVOIDANCE AND NAVIGATION for use as an onboard locating apparatus to monitor interrogation signals and ISLS signals transmitted by at least one secondary surveillance radar and coded reply signals transmitted by at least one fixed ground transponder to match the transponder reply signals with the ISLS signals. As a result, the system is able to associate the transponder signals with interrogations from the radar and repeatedly compute the aircraft's instantaneous position in space. The computations are based upon hyperbolic and linear functions. U.S. Pat. Nos. 4,107,674 and 4,196,434 both issued to Funatsu, et al. set forth related disclosures similar to that set forth in the above-described reissue U.S. Pat. No. Re. 32,368.

U.S. Pat. No. 4,835,537 issued to Manion sets forth TELEMETRY BURST COLLISION AVOIDANCE SYSTEM which provides warning and avoidance maneuvers for all fixed and moving obstructions which threaten the safe navigation of the host aircraft. The system is effective against threatening aircraft, runway maintenance vehicles and prominent geographic obstructions such as radio towers and mountain peaks. The system is capable of simultaneously broadcasting its host location and intended movement while receiving the same information from all nearby similarly equipped stations and aircraft.

U.S. Pat. No. 3,895,382 issued to Litchford sets forth a METHOD AND APPARATUS FOR MEASURING PASSIVELY RANGE AND BEARING in which apparatus for determining passively the slant range and bearing angle to another transponder equipped aircraft within a selectable proximity to a host aircraft equipped with the collision avoidance system is provided. The azimuthal lines of position from interrogating standard secondary surveillance radar ground stations to both aircraft and the times of arrival at the host aircraft of the transponder replies of other aircraft are determined. From such data the bearing angles to the actual and imaginary locations of the transponder equipped aircraft are calculated.

U.S. Pat. No. 4,380,050 issued to Tanner sets forth an AIRCRAFT LOCATION AND COLLISION AVOIDANCE SYSTEM in which the azimuth and range information of an aircraft with respect to a reference ground station is made available to other aircraft by transmission of a pulse at a time uniquely associated with the aircraft's location. A synthetic azimuth function and synthetic range function provide a periodic mapping of an area. The synthetic azimuth function is a slowed time expanded representation of a conventional azimuth function. Each azimuth increment is allocated a time slot in the synthetic azimuth function. The synthetic azimuth function is synchronized by counting a number of synchronizing pulses from a conventional azimuth function and a synthetic azimuth reference pulse is periodically transmitted from a reference ground station to synchronize all aircraft using the synthetic azimuth function.

While the foregoing described prior art devices have provided some measure of success in position fixing and collision avoidance, they are often complex and require substantial equipment both on the ground and in the various interacting aircraft. Thus, there remains a continuing need in the art for lower cost, simpler and more convenient to use position fixing systems suitable for aircraft or vessels at sea or the like.

SUMMARY OF THE INVENTION

Accordingly, it is a general object of the present invention to provide an improved position fixing system suitable for use by aircraft or vessels at sea or the like. It is a more particular object of the present invention to provide an improved position fixing system which is both passive and self-determined and which avoids complex and expensive components within the host aircraft.

In accordance with the present invention, there is provided for use in fixing the position of a mobile user, a passive position fixing system comprises: a directional radar unit producing a moving pulsed energy beam; a display system responsive to the radar unit for producing an image having image elements indicative of the relative positions of objects producing returning echoes when intercepting the energy beam; broadcast means responsive to the display system for transmitting a broadcast signal including the image; an omnidirectional radar unit separated from the directional radar unit by a predetermined distance having means for receiving a replica of the pulsed energy beam and retransmitting an omnidirectional replica thereof; mobile receiver means for receiving the pulsed energy beam, the omnidirectional replica, and the broadcast signal; and position means for displaying the image and indicating thereon which of the image elements corresponds to the mobile user.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
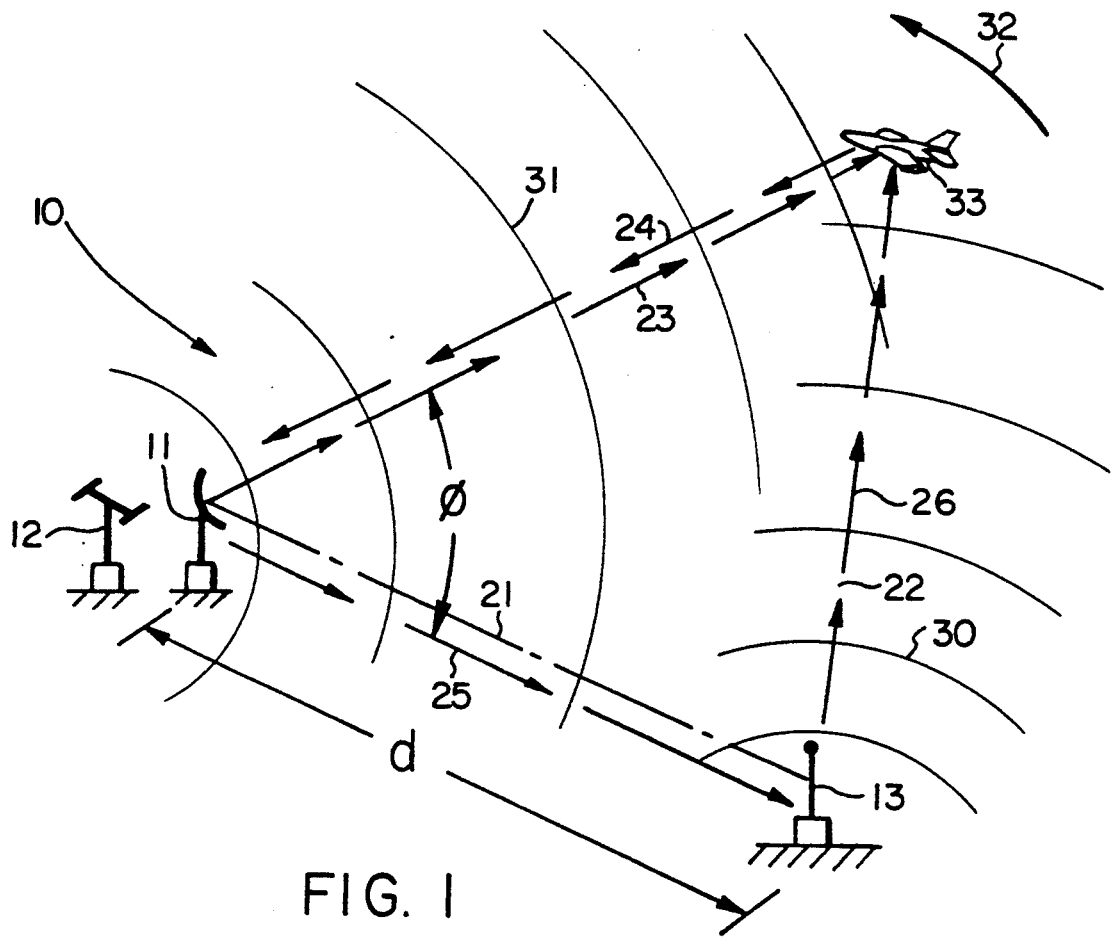
FIG. 1 sets forth a simplified diagram of a position fixing system constructed in accordance with the present invention.

FIG. 1 sets forth a diagrammatic view of a position fixing system constructed in accordance with the present invention and generally referenced by numeral 10. In the system of FIG. 1, a directional radar unit 11 produces a series of radar pulses 23 which emanate outwardly from directional radar 11 and which form a radar beam which rotates in the direction of arrow 32 to sweep the entire area surrounding directional radar 11. In accordance with conventional fabrication techniques, directional radar 11 need not be a guided or intelligent system but merely an automatic system which produces a confined radar beam 23 and which rotates or sweeps that radar beam at a constant angular velocity. In association with directional radar 11, a television type broadcast station 12 produces a radiated broadcast signal which in most situations will be uniformly radiated from television station 12 to form television type broadcast signals 31 emanating from television station 12. An omnidirectional radar unit 13 is spaced from directional radar 11 by a predetermined distance 21 and is coupled to directional radar 11 in either a direct communication link or via a through-the-air link such as microwave transmission or laser transmission to receive a series of pulse signals 25 which correspond to the pulsed signals produced by directional radar 11 and directed outwardly in swept radar beam 23. Omnidirectional radar unit 13 includes conventional equipment for retransmitting the received radar corresponding pulses from directional radar 11 in the form of an omnidirectional or nondirectional transmission indicated by wavefronts 30. It is important to know that omnidirectional transmission 30 comprises exclusively the retransmitted replicas of the radar pulses originally transmitted from directional radar 11 to omnidirectional radar 13 In accordance with the omnidirectional character of the output broadcast of radar 13, reception thereof may be obtained without regard to directionality for virtually any users within the range of omnidirectional radar 13. In contrast, however, reception of the radar pulses within the directional radar beam of radar 11 may be received by users solely during the brief interval during which the user is illuminated by the sweeping directional radar beam.

A typical aircraft 33 is shown within the airspace within which system 10 is operative. As can be seen, FIG. 1 depicts the resulting situation during the brief time interval in which directional radar beam 11 is directed at and illuminating aircraft 33. As mentioned, this interval is brief since directional radar 11 makes no attempt to track aircraft 33 but simply sweeps through the surrounding airspace. During this brief interval, however, the radar pulses 23 emanating from directional radar 11 illuminate aircraft 33 and produce a corresponding reflected series of echo pulses 24 which are received by directional radar 11. Simultaneously, a receiving antenna within aircraft 33 (set forth in FIG. 4) is operative to receive a portion of the radar pulse signal energy for use in signal processing described below in greater detail. However, suffice it to note here that during the brief time that directional radar 11 illuminates aircraft 33, echo pulses 24 are being reflected back to radar 11 and simultaneously received and processed by aircraft 33.

In addition to the reception of the output pulses of directional radar 11, aircraft 33 simultaneously receives the omnidirectional signals 30 from omnidirectional radar 13. As mentioned, the information within the omnidirectional transmission 30 from omnidirectional radar 13 include the retransmitted replicas of the radar pulses 25 which were simultaneously transmitted from directional radar 11 to omnidirectional radar 13 and retransmitted by the latter. Because no frequency change has been imposed upon these retransmitted omnidirectionally transmitted pulses, they to are received by aircraft 33 and processed in the manner set forth below in greater detail.

The final component for the present invention position fixing system is provided by television broadcast facility 12. In accordance with conventional radar system processing, directional radar 11 includes a display system such as a PPI system which provides a CRT type display showing the reflection pattern provided by returning echoes of the radar beam produced by directional radar 11 as it continuously sweeps the area. In further accordance with this conventional technology, each time radar beam 23 of directional radar 11 encounters an object capable of returning echoes such as echoes 24 from aircraft 33, a corresponding image element is produced upon the PPI display. With temporary reference to FIG. 2, an exemplary PPI type display is shown having a plurality of image elements shown thereon. Returning to FIG. 1, television broadcast facility 12 includes conventional television type broadcast equipment for transmitting or broadcasting the display image from the PPI type display of directional radar 12 shown in FIG. 2. The broadcast of television system 12 comprises a generally uniform omnidirectional broadcast shown as wavefronts 31 radiating outwardly in all directions from broadcast facility 12. It should be noted that in the event system 10 is located near significant obstacles such as mountain ranges or the like, the broadcast patterns for both television system 12 and omnidirectional radar 13 may be shaped to more efficiently cover the effected area and avoid wasting energy and creating unnecessary clutter against the nearby obstruction. However, the important aspect with respect to the present invention system is that omnidirectional radar 13 and television broadcast facility 12 provide generally uniform nondirectional signal broadcast throughout the airspace of interest. Thus, as aircraft 33 travels through the effected airspace of system 10, it also receives the outwardly traveling television broadcast signal from television facility 12.

Figure 2:
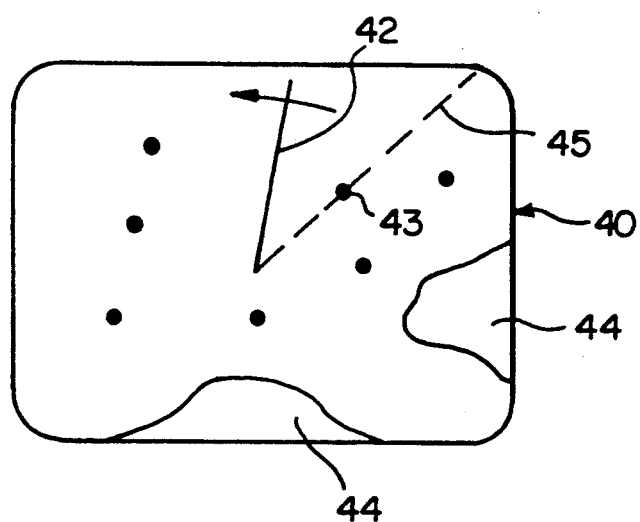
FIG. 2 sets forth an exemplary system display constructed in accordance with the present invention.

Thus, in accordance with the invention, aircraft 33 continuously receives the television broadcast signal of the PPI display from directional radar 11 and is periodically able to receive the swept radar beam from directional radar 11 and the retransmitted radar pulses from omnidirectional radar 13. By means set forth below in greater detail and in accordance with the present invention, aircraft 33 includes a receiver similar to a conventional television receiver for displaying the PPI-type image of directional radar 11 shown in FIG. 2. With the reception and display of the PPI display shown in FIG. 2, the aircraft user is able to view virtually all objects and users within the area of interest to the present invention system. However, examination of the display of FIG. 2 shows that the user within aircraft 33 is unable to determine without additional information which of the image elements upon the display correspond to the user's aircraft. In more expensive and exotic systems, each image element within the display is tagged with an identifying number or symbol. However, these identifiers are created solely for aircraft which carry expensive transmitting equipment to continuously broadcast an identifier tag. As mentioned above, this system is cost prohibitive for many types of aircraft and is generally undesirable for military aircraft during combat operations. Thus, the present invention will focus solely upon the operation of passive systems and it will be assumed that aircraft 33 is passive and does not broadcast any identification tag. Thus, the user within aircraft 33 must now be able to determine which image element upon the display shown in FIG. 2 corresponds to aircraft 33.

This additional information is provided by the present invention system through the reception of the directional beam of directional radar 11 and the retransmitted omnidirectional broadcast of omnidirectional radar 13. As will be apparent from examination of FIG. 1, the radar pulses within the directed beam of directional radar 11 and the radar pulses transmitted to omnidirectional radar 13 are synchronized and leave directional radar 11 simultaneously. It will be equally apparent, however, that the signals within radar pulses 23 are directly received and those within the omnidirectional transmission travel different distances and thus do not arrive simultaneously at aircraft 33. As will also be apparent from FIG. 1, the radar pulses transmitted omnidirectionally arrive subsequent to or delayed from those directly transmitted within the radar beam of directional radar 11.

Figure 3:
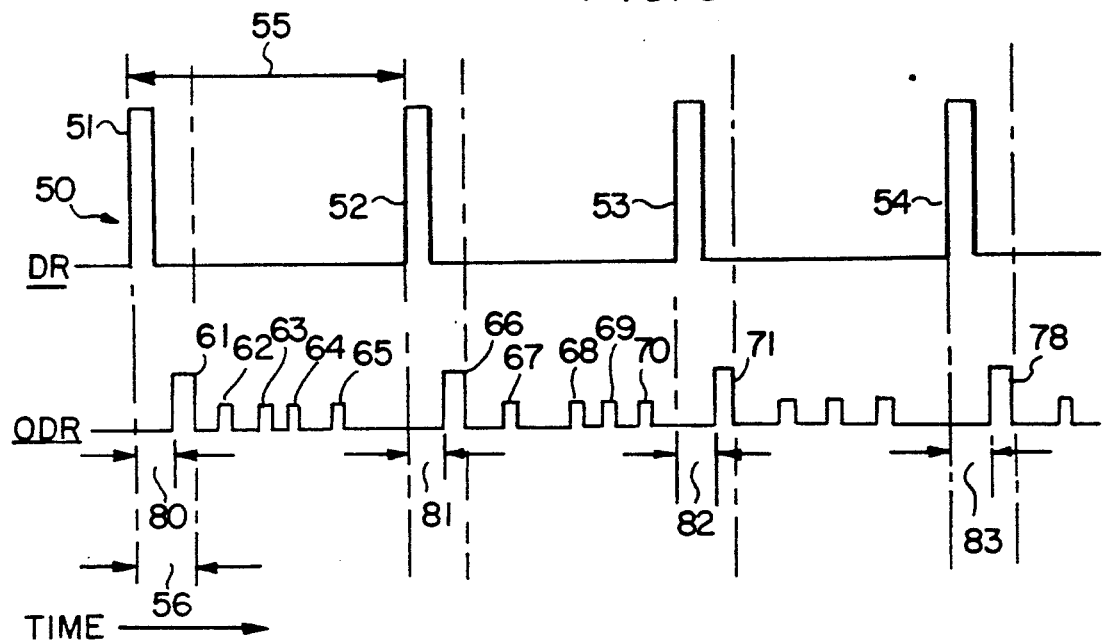
FIG. 3 sets forth a plurality of waveforms depicting several signals processed by the present invention system.

FIG. 3 sets forth a sample of the received signals within aircraft 33 during the interval within which aircraft 33 is illuminated by the swept beam of directional radar 11. FIG. 3 shows two signal waveforms which are received by aircraft 33 during its illumination by directional radar 11. Waveform 50 comprises a series of detected radar pulses 51 through 54 produced by directly transmitted radar pulses from directional radar 11. Waveform 60 comprises a plurality of radar pulse signals produced by omnidirectional radar 13. At this point, an important aspect of the present invention should be understood. While the depiction in FIG. 1 is that which focuses solely upon aircraft 33 within the airspace of the present invention system and, as a result, discussions relating to FIG. 1 and the omnidirectional transmission of omnidirectional radar 13 have excluded reference to other aircraft in the area, in most situations this exclusivity will not occur. In other words, generally the present invention system is operating in an environment in which a plurality of aircraft such as aircraft 33 are operative. Because directional radar beam 11 will illuminate all of these additional aircraft as well as surrounding clutter objects such as mountains, buildings, radio towers and so on as it sweeps the surrounding airspace, the receiving system within aircraft 33 will most likely receive the omnidirectionally retransmitted radar pulses together with a plurality of additional radar pulses reflected from additional aircraft and objects. Waveform 60 depicts this situation in which a plurality of pulses are shown. The challenge for the present invention system is to determine which detected radar pulse within waveform 60 corresponds to the omnidirectional broadcast radar pulse.

Examination of waveform 50 shows that a series of detected radar pulses 51 through 54 are periodically spaced and separated by a period 55. Because the radar pulses originally broadcast by directional radar 11 are periodic, it follows that the retransmitted omnidirectional pulses must also be periodic. Thus, one important piece of information is that within wave form 60, the omnidirectional pulses will be periodic. In addition, it is also known that the distance between directional radar 11 and omnidirectional radar 13 is selected to provide a transmission path delay which is sufficiently short to assure that the omnidirectional retransmitted signals fall within a predetermined delay interval after each directly transmitted radar pulse. Thus, a conventional timing system within the receiver or aircraft 33 establishes a predetermined gating interval shown as interval 56 which sets a time interval within which it is anticipated that the omnidirectional radar pulse will be received. Thus, as can be seen in FIG. 3, pulses 61, 66, 71 and 72 occur during the gating interval following directly transmitted pulses 51 through 54 respectively. Therefore, the system assumes that pulses 61, 66, 71 and 72 are the omnidirectional retransmitted pulses. Based upon this assumption, the system them measures the time delay shown as intervals 80, 81, 82 and 83 which the omnidirectional retransmitted pulses exhibit and using this time delay and the known separation between directional radar 11 and omnidirectional radar 13, the distance of aircraft 33 from directional radar 11 may be computed. In addition, the detection of the illuminating interval of directional radar 11 for aircraft 33 may be readily detected and coordinated with display 40 (seen in FIG. 2) to establish the bearing of aircraft 33 with respect to directional radar 11. These two pieces of information applied to display 40 permit the determination that aircraft 33 corresponds to image object 43 upon display 40 in FIG. 2.

Figure 4:
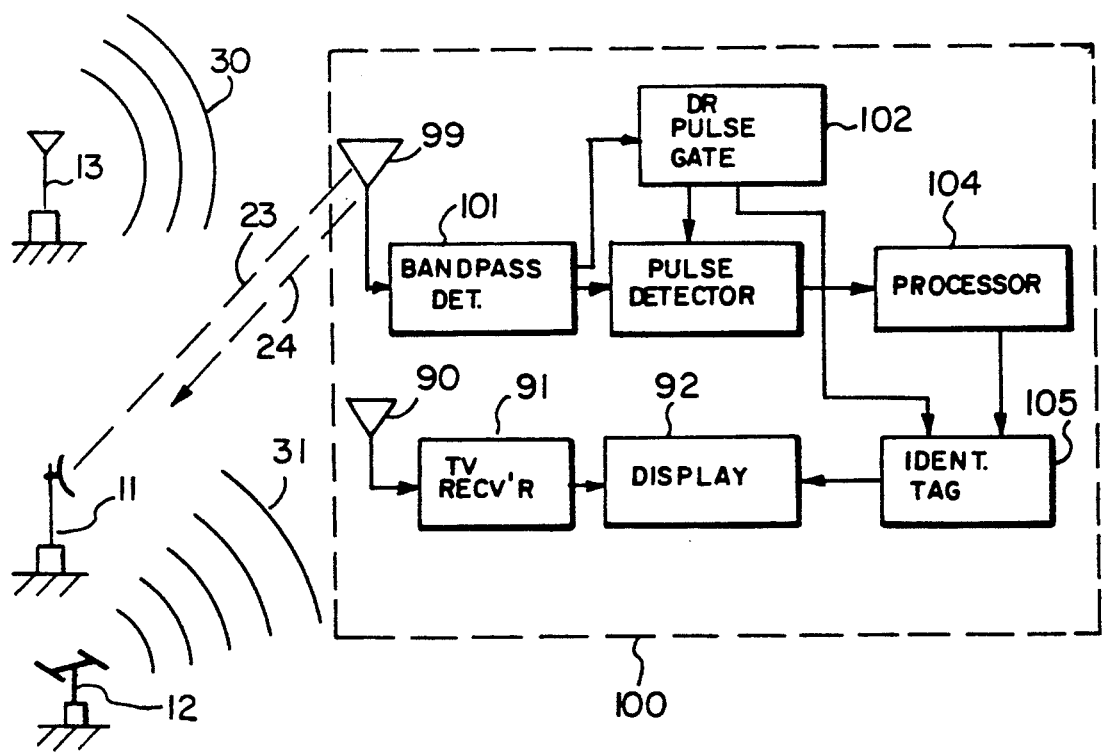
FIG. 4 sets forth a block diagram of a position fixing system constructed in accordance with the present invention.

FIG. 4 sets forth a block diagram of the present invention position fixing system. In the system shown in FIG. 4 as in the system set forth in FIG. 1, a directional radar 11 includes conventional radar technology for producing a directed radar beam having a series of pulse signals therein referenced by numeral 23. As is also mentioned above, directional radar 11 operates to continuously sweep the surrounding airspace and receive the returning echo signals such as echo signal 24 from aircraft 33 resulting from illumination by the directed beam. As is also set forth above, directional radar 11 includes conventional PPI display technology for producing a display such as that shown in FIG. 2. A television facility 12 receives the PPI type display from directional radar 11 and broadcasts that display in a television-type format broadcast signal 31. As is also shown above and described in connection with FIG. 1, an omnidirectional radar 13 receives simultaneously transmitted replicas of the radar pulses produced by directional radar 11 and retransmits these radar pulse replicas in an omnidirectional transmission 30.

Dashed line enclosure 100 encloses the portion of the present invention position fixing system which would normally be resident within the user's aircraft or vessel. Thus, within system 100, a conventional antenna 90 suitable for receiving the television broadcast signals produced by television facility 12 is coupled to a television broadcast receiver having conventional signal processing circuitry for producing appropriate image display signals for display upon a conventional display unit 92. In its anticipated form, display unit 92 may comprise a conventional display such as a cathode ray tube or the like. As mentioned above, the information modulated upon the transmitted carrier of television facility 12 comprises the properly formatted image signals which correspond to the PPI display shown in FIG. 2. Thus, display 92 produces a television type image corresponding to the PPI type display of directional radar 11 showing each image object in the swept area.

System 100 further includes an antenna 99 tuned to receive the radar pulses produced by directional radar 11 and omnidirectional radar 13. A bandpass filter and signal detecting system 101 processes the received signals from directional radar 11 and omnidirectional radar 13 to detect and recover the pulse signals. Bandpass detector 101 is commonly coupled to a directional radar pulse gate 102 and a pulse detector 103.

At this point it should be apparent to those skilled in the art that the present invention system functions best if some capability is provided for distinguishing between pulse signals directly radiated by directional radar 11 and those omnidirectional retransmitted signals produced by omnidirectional radar 13. For example, the retransmitted pulses from omnidirectional radar 13 may be modified slightly such as shifted in frequency or duration to impart a distinguishing characteristic which may be utilized by the circuitry within the user aircraft to distinguish between directly transmitted radar pulses from radar 11 and omnidirectional transmitted pulses from radar 13. Utilizing this distinguishing characteristic, pulse gate circuit 102 produces a timing or gating signal which is coupled to pulse detector 103 and is utilized thereby to limit the operation of pulse detector 103 to the gating interval such as interval 56 in FIG. 3 during which omnidirectional pulses will be accepted. Using conventional timing circuitry, pulse detector 103 determines the time delay interval such as interval 80 in FIG. 3 by which the omnidirectional pulse lags the directly transmitted pulse (pulse 51 in FIG. 3) and thereby produce the required delay information. Concurrently, pulse gate 102 produces a trigger signal which is coupled to identifier tag circuit 105 and provides the information to tag circuit 105 necessary to enhance display 92 each time aircraft 33 is illuminated by the directional radar beam from radar 11. Identifier tag 105 produces a vector signal such as line 45 on display 40 shown in FIG. 2. Thus, the indication of the period of illumination by the direct radar beam provides the necessary bearing information within display 40 to assist in identifying aircraft 33 upon the display.

Finally, processor 104 performs a mathematical calculation based upon the timed delay interval by which the omnidirectional pulses lag the directional pulses to determine the necessary range information and provide an indicator signal for display 92 which identifies object 43 (seen in FIG. 2) as aircraft 33 upon display 40.

It will be apparent to those skilled in the art that given the known distance between directional radar 11 and omnidirectional radar 13 and therefore the known transmission time therebetween together with the time difference between directly radiated radar pulses and those retransmitted omnidirectionally, that a unique solution for the range information of aircraft 33 ay not be determined in the generalized case. However, it will be equally apparent to those skilled in the art that the added limitation of the bearing information provided by detecting the interval of illumination of aircraft 33 by directional radar 11 permits the identification of the image object corresponding to aircraft 33. In other words, it is not necessary in the present invention system to provide a unique solution calculation which would uniquely position aircraft 33 within display 40 but rather is merely necessary to determine which image object along vector 45 in display 40 corresponds to aircraft 33. For this limited purpose, the family of solutions provided using the time differential between pulse signals and the known distance between the directional and omnidirectional radar transmitters is sufficient.

What has been shown is a passive self-determined position fixing system suitable for use by aircraft and ocean-going vessels. The system is passive in that it does not require transmission of any energy from the user and is self-determined in that it requires no additional assistance or calculation information or the like from the ground based elements. The system utilizes a conventional directional radar system together with an omnidirectional radar unit used in association therewith. A conventional television broadcast type transmission of the PPI display derived by the directional radar system completes the ground based portion of the present invention system. Because no additional calculations or operation is required by the user, the system is extremely user friendly and does not interfere with other activities of the user. Finally, the system may be fabricated utilizing presently available system components and given the information provided herein may be fabricated by those skilled in the art.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in fixing the position of a mobile user, a passive position fixing system comprising:
   a directional radar unit producing a moving pulsed energy beam;
   a display system responsive to said radar unit for producing an image having image elements indicative of the relative positions of objects producing returning echoes when intercepting said energy beam;
   broadcast means responsive to said display system for transmitting a broadcast signal including said image;
   an omnidirectional radar unit separated from said directional radar unit by a predetermined distance having means for receiving a replica of said pulsed energy beam and retransmitting an omnidirectional replica thereof;
   mobile receiver means for receiving said pulsed energy beam, said omnidirectional replica, and said broadcast signal; and
   position means for displaying said image and indicating thereon which of said image elements corresponds to said mobile user.

2. A passive position fixing system as set forth in claim 1 wherein said position means includes:
   pulse detecting means for detecting said energy pulses from said pulsed energy beam and said omnidirectional replica;
   timing means for determining the time delay between said energy pulses; and
   calculating means for establishing a solution set of the distance of said mobile user from said directional radar unit.

3. A passive position fixing system as set forth in claim 2 wherein said position means includes:
   gate means responsive to illumination of said mobile user by said pulsed energy beam producing a bearing indicator signal for use in determining the bearing of said mobile user relative to said directional radar unit.

4. For use in fixing the position of a mobile user, a passive position fixing method comprising the steps of:
   transmitting energy pulses in a swept directional pulsed energy beam;
   receiving returning echoes from objects illuminated by said directional pulsed energy beam and constructing an image having a plurality of image elements depicting the relative positions of said objects;
   receiving and retransmitting said energy pulses in an omnidirectional transmission;
   broadcasting a broadcast signal carrying said image;
   receiving said directional pulsed energy beam, said omnidirectional transmission, and said broadcast signal;
   recovering said energy pulses from said directional pulsed energy beam, said retransmitted energy pulses from said omnidirectional transmission and said image from said broadcast signal; and
   displaying said image and providing an indication of which image element therein corresponds to said mobile user.

5. The method set forth in claim 4 wherein said step of displaying includes the steps of:
   determining the time delay of said energy pulses from said omnidirectional transmission with respect to said energy pulses from said directional pulsed energy beam;
   detecting the illumination of said mobile user by said directional pulsed energy beam and providing a corresponding bearing indication on said image; and
   using the time delay and the bearing indication to identify the image element within said image corresponding to said mobile user.

6. The method set forth in claim 5 wherein said broadcasting step includes a television-type broadcasting.

7. The method set forth in claim 6 wherein said step of determining the time delay includes the steps of:
   establishing a time interval following each recovered energy pulse from said directional pulsed energy beam; and
   accepting for delay determination only recovered energy pulses within each time interval.

8. For use in fixing the position of a mobile user, a passive position fixing means comprising:
   means for transmitting energy pulses in a swept directional pulsed energy beam;
   means for receiving returning echoes from objects illuminated by said directional pulsed energy beam and constructing an image having a plurality of image elements depicting the relative positions of said objects;
   means for receiving and retransmitting said energy pulses in an omnidirectional transmission;
   means for broadcasting a broadcast signal carrying said image;
   means for receiving said directional pulsed energy beam, said omnidirectional transmission, and said broadcast signal;
   means for recovering said energy pulses from said directional pulsed energy beam, said retransmitted energy pulses from said omnidirectional transmission and said image from said broadcast signal; and
   means for displaying said image and providing an indication of which image element therein corresponds to said mobile user.

9. Passive position fixing means as set forth in claim 8 wherein means for displaying includes:
   means for determining the time delay of said energy pulses from said omnidirectional transmission with respect to said energy pulses from said directional pulsed energy beam;
   means for detecting the illumination of said mobile user by said directional pulsed energy beam and providing a corresponding bearing indication on said image; and means for using the time delay and the bearing indication to identify the image element within said image corresponding to said mobile user.

10. Passive position fixing means as set forth in claim 9 wherein said means for broadcasting includes means for television-type broadcasting.

11. Passive position fixing means as set forth in claim 10 wherein said means for determining the time delay includes:

means for establishing a time interval following each recovered energy pulse from said directional pulsed energy beam; and means for accepting for delay determination only recovered energy pulses within each time interval.

* * * * *